United States Patent
Xia et al.

(10) Patent No.: US 8,306,373 B2
(45) Date of Patent: Nov. 6, 2012

(54) FIBER BRAGG GRATING SENSING PACKAGE AND SYSTEM FOR GAS TURBINE TEMPERATURE MEASUREMENT

(75) Inventors: Hua Xia, Altamont, NY (US); Kevin Thomas McCarthy, Troy, NY (US); Michael Joseph Krok, Clifton Park, NY (US); Boon Kwee Lee, Clifton Park, NY (US); Christian Joseph Wagner, Latham, NY (US); Ronald Kevin Gilstrap, Easley, SC (US); James Richard Nutt, Greer, SC (US); Kung-Li Deng, Princeton, NJ (US); David Robert O'Connor, Gardnerville, NV (US); Juntao Wu, Niskayuna, NY (US); James Gerard Lopez, East Schodack, NY (US)

(73) Assignee: General Electric Company, Niskayuna, NY (US)

( * ) Notice: Subject to any disclaimer, the term of this patent is extended or adjusted under 35 U.S.C. 154(b) by 475 days.

(21) Appl. No.: 12/466,442

(22) Filed: May 15, 2009

(65) Prior Publication Data
US 2010/0290733 A1 Nov. 18, 2010

(51) Int. Cl.
*G02B 6/00* (2006.01)
*G02B 6/34* (2006.01)
*G06F 19/00* (2011.01)
*G06G 7/70* (2006.01)

(52) U.S. Cl. ............ 385/12; 385/37; 385/113; 385/136; 385/137; 701/100

(58) Field of Classification Search ........................ None
See application file for complete search history.

(56) References Cited

U.S. PATENT DOCUMENTS

| | | | |
|---|---|---|---|
| 5,628,182 A | 5/1997 | Mowill | |
| 5,832,164 A * | 11/1998 | Miekis | 385/136 |
| 5,845,037 A * | 12/1998 | Miekis | 385/136 |
| 6,775,986 B2 | 8/2004 | Ganz et al. | |
| 6,785,443 B2 * | 8/2004 | Mendez et al. | 385/37 |
| 6,885,805 B2 * | 4/2005 | Asada | 385/134 |
| 6,898,354 B2 * | 5/2005 | Kim et al. | 385/100 |
| 6,923,048 B2 | 8/2005 | Willsch et al. | |
| 7,336,862 B1 | 2/2008 | Xai et al. | |
| 2003/0172752 A1 * | 9/2003 | Kluth et al. | 73/866.5 |
| 2004/0109650 A1 * | 6/2004 | Kim et al. | 385/100 |
| 2006/0059917 A1 | 3/2006 | Plimpton et al. | |
| 2006/0215959 A1 | 9/2006 | McCarthy et al. | |
| 2008/0095612 A1 | 4/2008 | Girbig et al. | |
| 2009/0055071 A1 * | 2/2009 | Way et al. | 701/100 |

* cited by examiner

*Primary Examiner* — Rhonda Peace
(74) *Attorney, Agent, or Firm* — Ann M. Agosti (57) ABSTRACT

A fiber Bragg grating multi-point temperature sensing system comprises a fiber sensing cable package and a plurality of clamping devices distributed along an inner surface of a wall in a circumferential direction for securing the fiber sensing cable package. The fiber sensing cable package comprises a fiber Bragg grating based sensing cable comprising at least one optical fiber, a plurality of Bragg gratings inscribed in the optical fiber, and a fabric layer and a sheath tube surrounding the optical fiber. The multi-point fiber temperature sensing system comprises a light source for transmitting light to the Bragg gratings based sensing cable package, and a detector module receiving reflected signal. Each clamping device comprises a radiation tee and defines at least one mounting hole for securing the fiber sensing cable.

12 Claims, 10 Drawing Sheets

FIBER BRAGG GRATING SENSING PACKAGE AND SYSTEM FOR GAS TURBINE TEMPERATURE MEASUREMENT

BACKGROUND

The invention relates generally to sensing technologies and, more particularly, to fiber optic sensing packages and systems for multi-point temperature measurements for a gas turbine, for example.

Temperature sensing is essential for safe and efficient operation and control of many industrial processes. Industrial processes such as gas turbine, coal boiler operation, combustion, power generation, and gasification involve the measurement of high temperatures either for real-time industrial process monitoring or for control and optimization.

Gas temperature is one of the critical control parameters for gas turbine operation, and any improvement of accuracies of the temperature measurement can improve turbine efficiency. The temperature at the exhaust duct of the compressor/gas turbine approaches 600-1200 degrees Fahrenheit (° F.) with a very strong gas mass flow, and the direct combustor temperature measurement for control purposes is beyond capabilities of most temperature measurement equipment. In combustion control practice, an annular array of thermocouples is used to measure exhaust temperature to control fuel flow into the combustor. Whenever a fault temperature, either too cold or too hot, is detected, either the fuel flow rate adjustment or a premature shutdown of the gas turbine occurs. Such a combustion control method requires accurate annular exhaust temperature measurement. However, current exhaust temperature measurement using the annular array of thermocouples (TCs) provides only limited sensing points, and the sensing spatial resolution is about half a meter which can be larger than optimum. Accordingly, a control strategy of the gas turbine has an excessive margin, which results a lower power generation efficiency and lower diagnostic capabilities. However, it is difficult to increase the number and location of the existing TCs from the current method due to their bulky packaging and excessive electrical wiring needs.

Silicon dioxide based quartz fiber material melts at high temperatures such as, for example temperatures at about 2700° F., and thus silicon dioxide material based tetrahedral fiber Bragg grating (FBG) sensors are thought to be of great potential to be used for multi-point temperature measurement from harsh environments such as turbomachinery systems, combustors, generators, engines, and gasifiers. Further, FBG sensors comprise high quality reflectors constructed in optical quartz fibers that reflect particular wavelengths of light and transmit other wavelengths. FBG sensors are advantageous as having low mass, high sensitivity, multiplexing capabilities, multi-point distribution capabilities, multi-sensing functions, and electromagnetic interference immunity.

Monitoring gas turbine operation conditions requires not only thermal stabilized fiber Bragg grating sensors, but also a robust fiber sensor package. It would be useful to have a sensor package that is easily deployable inside the gas turbine for multi-point temperature measurement or any transient thermal dynamics measurement. The installed fiber sensor packages should survive the initial gas turbine startup and transient temperature ramping from ambient up to 1000-1200° F. Considering the exhaust gas that may include CO, $CO_2$, Nox, $H_2O$ etc, a fiber sensor package should be hermetically sealed not only for a reliable temperature measurement but also for maintaining strong mechanical strength against vibration, thermal cycles, and stress corrosion induced mechanical fatigues.

However, deploying fiber sensors in any industrial power generation system definitely requires a proper fiber sensor package and the corresponding installation methods. Meanwhile, since each industrial system operation condition may vary in temperature, pressure, flow-rate, vibration, and corrosion, for example, the installation methods may differ from one industrial system to another industrial system. It is desirable to have an improved FBG sensor package, installation method, and an integrated sensing system that can survive different harsh environmental conditions.

BRIEF DESCRIPTION

In accordance with an embodiment disclosed herein, a fiber Bragg grating multi-point temperature sensing system comprises a fiber sensing cable package and a plurality of clamping devices distributed along an inner surface of a wall in a circumferential direction for securing the fiber sensing cable package. The fiber sensing cable package comprises a fiber Bragg grating based sensing cable comprising at least one optical fiber, a plurality of Bragg gratings inscribed in the optical fiber, and a sheath tube surrounding the optical fiber. The fiber sensing cable package comprises a light source for transmitting light to the Bragg gratings, and a detector module receiving light reflected from the Bragg gratings. Each clamping device comprises a radiation tee and defines at least one mounting hole for securing the fiber sensing cable.

In accordance with another embodiment disclosed herein, a fiber sensing cable package comprises an optical fiber comprising a fiber core and cladding and a coating layer surrounding the fiber cladding, a plurality of Bragg gratings inscribed in the fiber core, a fabric layer surrounding the fiber cladding, a sheath tube around the fabric layer, a light source for transmitting light to the Bragg gratings, and a detector module for receiving light reflected from the Bragg gratings. The fabric layer comprises a thermal expansion coefficient compatible with the thermal expansion coefficient of the fiber material.

In accordance with still another embodiment disclosed herein, a method comprises obtaining a fiber inscribed with a plurality of Bragg gratings and attaching the fiber to a pre-existing rigid metal rod. The metal rod comprises a plurality of through-holes in an outer surface thereof and along a length of the rod. The Bragg gratings are each in a corresponding through-hole.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the invention relate to fiber Bragg grating (FBG) based temperature sensing packages and a method of installing the FBG sensing packages in a harsh environment such as a gas turbine.

Figure 1:
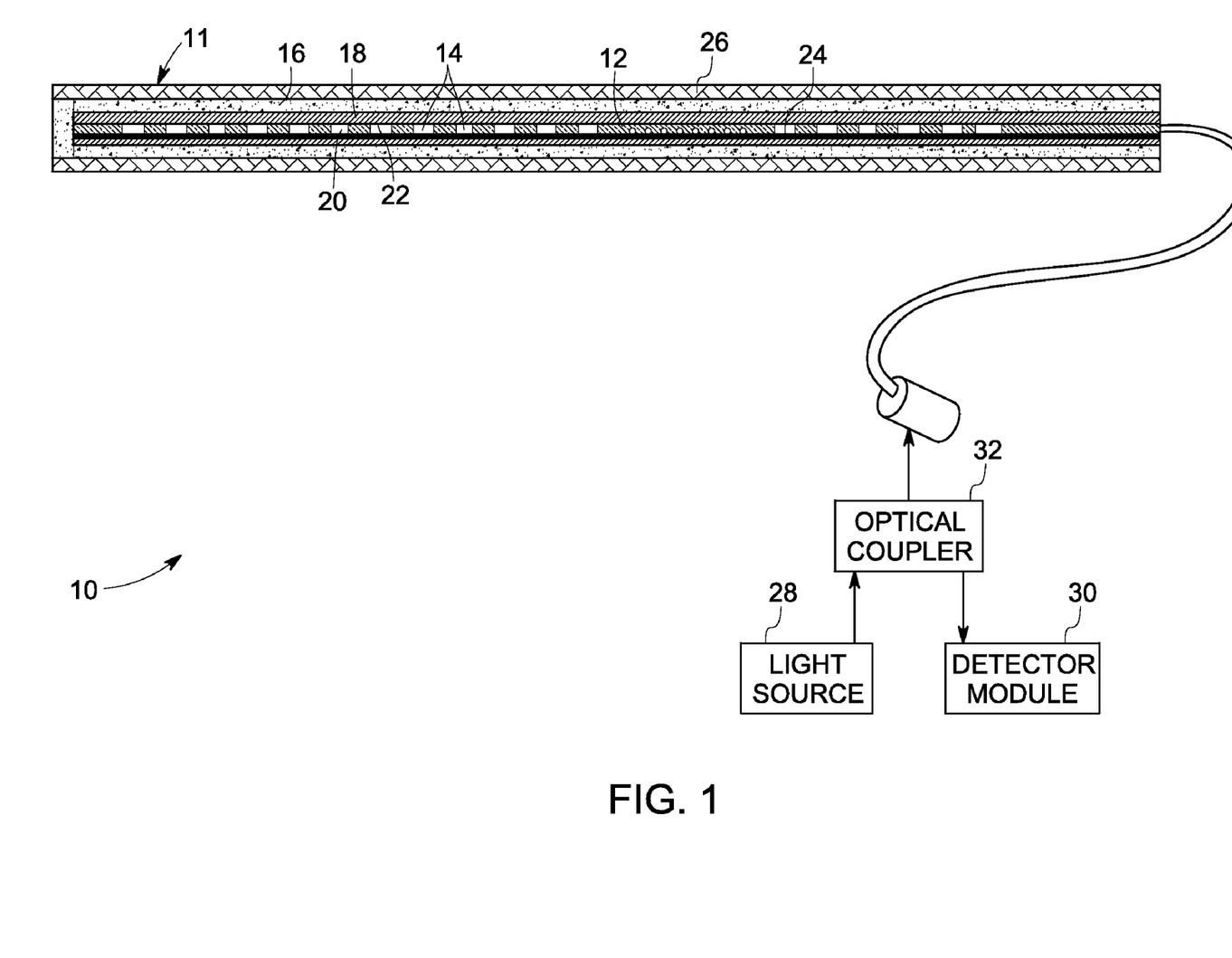
FIG. 1 is a simplified cross-sectional view of an exemplary fiber Bragg grating (FBG) sensing cable package according to one embodiment of the invention.
Figure 2:
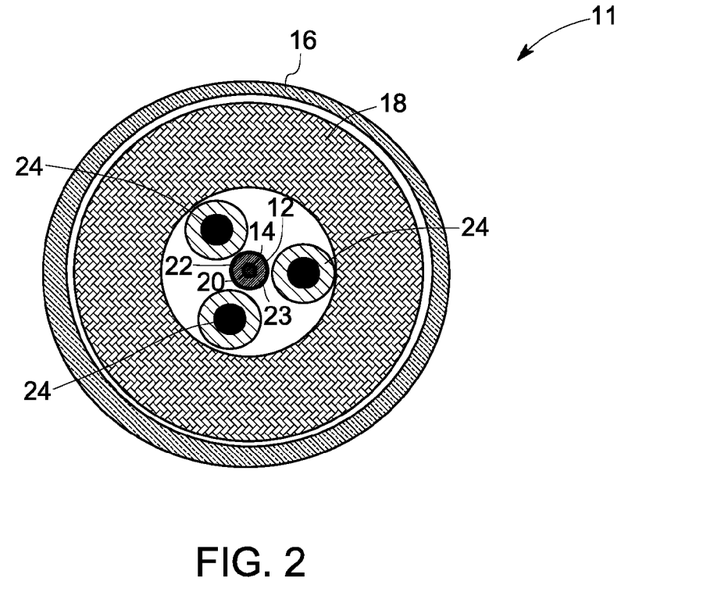
FIG. 2 is an exemplary cross-sectional view of a FBG sensing cable of the FBG sensing cable package in FIG. 1.

Referring to FIGS. 1 and 2, an FBG sensing cable package 10 for measurement of high temperatures comprises a FBG sensing cable 11 which comprises an optical fiber 12, a plurality of Bragg gratings 14 inscribed in the optical fiber 12, an outer sheath tube 16 surrounding the optical fiber 12, and a fabric layer 18 between optical fiber 12 and outer sheath tube 16.

In one embodiment, optical fiber 12 comprises a fiber core 20, a cladding 23 (FIG. 2), and a polymer coating 22 surrounding cladding 23. In certain embodiments, a metal coating 22 will be used to protect the fiber cladding. In certain embodiments, fiber core 20 comprises germanium and fluorine co-doped silicon dioxide material. In another embodiment, fiber core is silicon dioxide with a fluorine doped silicon dioxide cladding. In still another embodiment, the fiber core comprises quartz. Polymer coating 22 may comprise acrylate, silicone, polyimide, carbon, or a combination thereof. Polymer coating 22 is advantageous as having mechanical flexibility and low cost and as enhancing mechanical strength of the optical fiber for facilitating assembly of the FBG sensing cable package 10. However, polymer coatings 22 generally have relatively low melting temperatures, for example, about 750 degrees Fahrenheit (° F.) (400 degrees Centigrade (° C.)) for polyimide coating. In conventional FBG sensing cable packages without fabric layer 18, under elevated temperature, the polymer layer may melt and adhere to an inner surface of sheath tube 16. Sheath tube 16 has a larger thermal expansion coefficient as compared with the optical fiber material and expands under the elevated temperature which, without the fabric layer 18, might otherwise result in breaking of polymer coating 22 and/or optical fiber 12.

It is advantageous for the fabric layer 18 to have a thermal expansion coefficient compatible with that of the fiber 12. As used herein "compatible" means that the coefficients of thermal expansion (CTE) of the fabric layer 18 and optical fiber 12 are close enough so that the fiber will not break up due to thermal expansion of fabric layer 18 under elevated temperatures. In certain embodiments, fiber core 20 and fabric layer 18 have substantially the same CTEs. In certain embodiments, the compatibility is achieved by using fabric layer 18 comprising at least 80 percent optical silicon dioxide or silica material by weight. In one embodiment, for example, fabric layer 18 may comprise silica fabric manufactured by leaching a fiberglass cloth to $SiO_2$, a fiberglass coated with fluorine rubber, a fiberglass fabric coated with polychloroprene, a fiberglass coated with silicon rubber, or poly(tetrafluoroethylene) coated fiberglass, for example. In certain embodiments, fabric layer 18 may be in a form of a sleeve surrounding the optical fiber 12, a sheet or mesh wrapped around the optical fiber 12, or bunches of fibers wound around the optical fiber 12. Under elevated temperature, polymer coating 22 may melt or adhere to an inner surface of the fabric layer 18. As the fabric layer 18 has a compatible thermal expansion coefficient with the fiber 12, the fabric thus protects the fiber from damage, and further protects the FBG sensing cable package 10. In one embodiment of the invention, the fabric layer 18 comprises a sleeve, and the optical fiber is inserted into the sleeve and is loosely received in the fabric layer 18. A physical property of one exemplary fabric material for fabric layer 18 is shown in table 1 below.

TABLE 1

| Optical fiber protection fabric material physical properties | |
|---|---|
| Continuous operation temperature | 2000 F. |
| Maximum operation temperature | 3100 F. |
| Main material | 98% SiO2 |
| Thermal conductivity at 500 F. | 0.45 (BTU in/Hr · F. · ft2 |
| Tensile strength | 0.5 × 106 psi |
| Modules of elasticity | 10.5 × 106 psi |
| Porosity | 1% |
| Material properties | Inorganic and no smoke when exposed to heat |

In certain embodiments, fiber Bragg gratings 14 are inscribed in the fiber core 20 by a photochemical process, such as by ultraviolet (UV) laser light or near infrared (NIR) femtosecond laser light inscription, which is followed by a thermal annealing process at temperatures between about 1000° F. and about 1500° F. The photochemical process usually requires removal of portions of the polymer coating 22 from the optical fiber 12 so as to allow the laser light to reach the fiber core 20 with sufficient intensity to effect the desired transition. The polymer coating 22 may be stripped from the grating region by various means with one example comprising dissolving the polymer in sulfuric acid. The optical fiber 12 loses strength in the area with polymer coating 22 partially removed, and thus, in one embodiment, after the fiber Bragg gratings 14 are formed in the core 20, the portions of the optical fiber 12 from which the polymer coating 22 was stripped are recoated. In another embodiment as can be best seen in FIG. 2, FBG sensing cable package 10 further comprises at least one longitudinal reinforcement member 24 enclosed in the fabric layer 18 together with the optical fiber 12 to increase rigidity of the FBG sensing cable 11. In the illustrated embodiment of FIG. 2, the reinforcement member 24 comprises one or multiple multi-mode fibers. Each multi-mode fiber comprises a fiber core 25 and cladding with a polymer coating or metal (Cu, Ni, Al etc) coating such as copper, nickel or aluminum. In certain embodiments, optical fiber 12 and multi-mode fibers 24 may be twisted together and protected by polymer coating 22.

Referring to FIG. 1, in one embodiment, outer sheath tube 16 comprises metal material and a polished outer surface. In this embodiment, short-wavelength thermal radiation energy from the environment is reflected by the polished outer surface of the sheath tube 16 without affecting temperature measurement accuracy. One exemplary sheath tube 16 material is Inconel 600 or Inconel based alloys, and austenitic nickel-chromium-based superalloy materials, which have high temperature resistance and strong oxidation-resistance. In certain embodiments, an outer diameter of tube 16 is larger than 6.35 millimeter (mm), and a wall thickness of tube 16 is greater than 1.2 mm, accordingly sheath tube 16 will protect FBG sensing cable 11 and survive a harsh environment, such as hot gas flow, rotor blade rotation speed of 3000 to 3600 revolutions per minute (rpm), a natural vibration frequency ranging from 50 to 60 Hz, and potential harmonic components ranging from 100 Hz to 350 Hz.

Thermal response time refers to the time delay of the fiber sensing cable in response to a thermal variation, which is one of the important parameters for FBG sensing cable packages 10. A small thermal response time is desirable, which enable a gas turbine control system a faster response to temperature changes. For a FBG sensing cable 11, a smaller diameter and thinner wall of a sheath tube 16 will provide a relatively smaller response time, but will result in a structure that is relatively weaker and may fail to survive gas turbine harsh environment operation conditions. Another concern is that the vibration frequency of a smaller and thinner wall sheath tube could overlap with gas turbine rotor blade vibration frequency bandwidth. Use of heavier or larger tubing packaged FBG sensing cables may have a good survivability at the expense of a longer delay response time. One optimized package design balances the thermal response characteristic while the package tubing is off the resonant frequency of the rotor fundamental frequency and its high-order harmonic components. The thermal response time, $t_o$, can be calculated by equation 1:

$$t_o = r^2 \cdot c_p \cdot \rho / \kappa \qquad [1]$$

where r is the radius of the package materials, $c_p$ is specific heat of the package material, $\rho$ is mass density and $\kappa$ and thermal conductivity. In certain embodiments, the outer diameter of sheath tube 16 is ranging from 6.35 mm to 9.5 mm, and the wall thickness of sheath tube 16 is ranging from 1.2 mm to 2 mm.

Table 2 below gives an exemplary response time of a FBG sensing cable have the outer sheath tube 16 made from stainless steel, and fiber layer 18 has 1 mm radius and 3 mm air gap between the sheath tube 16 and fiber layer 18, the total response time from a thermal event is about 2.8 seconds. Because a heavy package could provide better mechanical strength for longer time survivability; the tradeoff is the relative long time delay for a fiber sensor to detect a thermal event. For turbine control and optimization purposes, a FBG sensing cable should survive gas turbine harsh operation conditions while having negligible thermal response time.

TABLE 2

FBG sensing cable response time

| Material | r (m) | P (km/m³) | $C_p$ (J/Kg C.) | K (W/m C.) | t (second) |
| --- | --- | --- | --- | --- | --- |
| Stainless steel | 0.003 | 8000 | 500 | 21.5 | 1.67 |
| Fiber sleeve | 0.001 | 66 | 740 | 0.068 | 0.72 |
| Air | 0.003 | 1.205 | 1005 | 0.0257 | 0.42 |
| Response times (s) | | | | | 2.8 |

In one embodiment, to prevent the FBG sensing cable vibration frequency from overlapping with the gas turbine fundamental vibration frequency, two kinds of sheath tubing sizes, with outer diameters of 3.175 mm and 6.35 mm, have been simulated at free clamping and fixed clamping conditions. When a sheath tube is in free clamping condition, the sheath tube can freely move only in horizontal axis but no free movement in vertical direction. While a sheath tube is in a fixed clamping condition, it is not allowed to move freely. In the free clamping embodiments, the 3.175 mm sheath tube is expected to have a vibration frequency close to 50 Hz, while a 6.35 mm tube is expected to have a vibration frequency at about 130 Hz. For a 7FA, 7FB and 9FA gas turbine, the normal vibration frequency from fundamental mode is either 50 Hz or 60 Hz. Thus, in one embodiment, a sheath tube 16 comprises a 6.35 mm Inconel sheath tube with a wall thickness greater than 1.2 mm.

In some embodiments, hot gas may radiate different electromagnetic waves and induce inaccurate gas temperature measurements. In the illustrated embodiment of FIG. 1, FBG sensing cable package 10 further comprises an outer woven sleeve 26 surrounding the sheath tube. The woven sleeve 26 may be used to attenuate long-wavelength thermal radiation energy (such as wavelengths greater than 2 micrometers). For any thermal radiation with longer wavelengths, this fiber sleeve material could effectively mitigate the influence of the thermal radiation either from the hot gas or from the diffuser wall.

With continued reference to FIG. 1, FBG sensing cable package 10 further comprises a light source 28 for transmitting light through optical fiber 12 to the Bragg gratings 14, and a detector module 30 for receiving light reflected from Bragg gratings 14. The FBG sensing cable package 10 may also include an optical coupler 32 to manage incoming light from the light source 28 as well as the reflected signals from the Bragg gratings 14. The coupler 32 directs the appropriate reflected signals to detector module 30.

The detector module 30 receives the reflected optical signals from the Bragg gratings 14 and, in cooperation with various hardware and software components, analyzes the embedded information within the optical signals. In one embodiment, the detector module 30 is configured to estimate a condition or a parameter of the environment based upon a reflection spectrum generated from the Bragg grating 14. In certain embodiments, the detector module 30 employs an optical spectral analyzer to analyze signals from the Bragg gratings 14. Depending on the desired application, the detector module 30 may be configured to measure various parameters in the environment. Examples of such parameters include temperature, the presence of gas, strain, pressure, vibration, and radiation.

In one embodiment, FBG sensing cable package 10 is used for temperature measurement in the harsh industrial environment of a turbomachinery system such as a combustor, generator, engine, or gasifier. When light from light source 28 is transmitted through optical fiber 12 to Bragg gratings 14, light energy is reflected by each of the Bragg gratings 14 at a corresponding Bragg wavelength $\lambda_B$ given by the equation 2:

$$\lambda_B = 2n_{eff}\Lambda, \qquad \text{equation 2}$$

wherein "$\lambda_B$" represents the Bragg wavelength of the corresponding Bragg grating 14, "$n_{eff}$" is the index of refraction, and "$\Lambda$" is the period of the Bragg grating 14. Both index of refraction ($n_{eff}$), and the period ($\Lambda$) of the Bragg grating 14 are functions of temperature and strain. When the FBG sensing cable package 10 is used for temperature measurement without exerting strain on the Bragg gratings 14, the wavelength shift ($\Delta y$) of each Bragg grating 14 is according to equation 3 below:

$$\Delta\lambda(T) = \lambda_B \left( \frac{1}{n_{\it eff}} \frac{\partial n_{\it eff}}{\partial T} + \alpha \right) T = \lambda_B (\beta + \alpha) T \qquad \text{equation 3}$$

Wherein "α" is coefficient of thermal expansion and "β" is thermo-optic coefficient. Considering both nonlinear thermal-optic effects and thermal expansion effects, the wavelength shift (Δλ) can be calibrated as a cubic function of temperature (T) by the equation 4:

$$\Delta\lambda(T)=a\Delta T+b\Delta T^2+c\Delta T^3. \qquad \text{equation 4}$$

Figure 3:
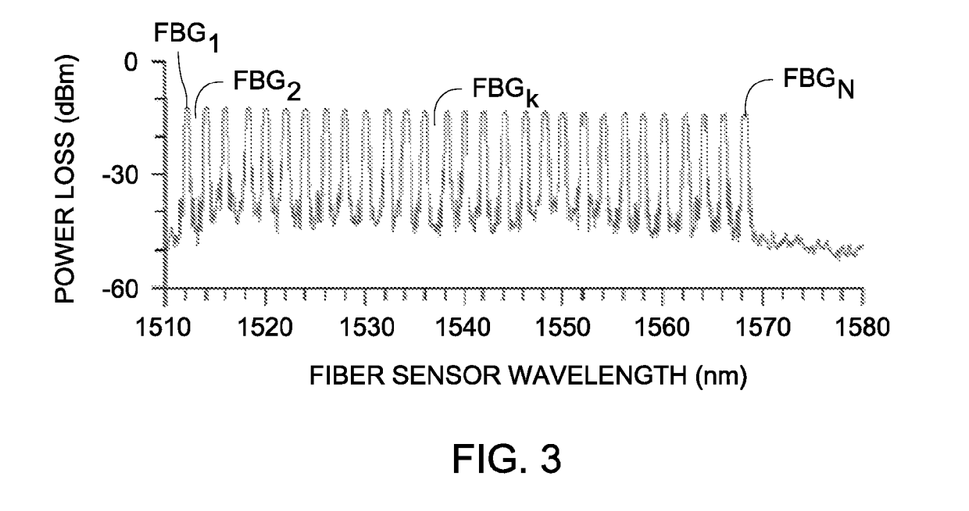
FIG. 3 is an exemplary wavelength spectrum of a plurality of Bragg gratings in the FBG sensing cable of FIG. 1.
Figure 4:
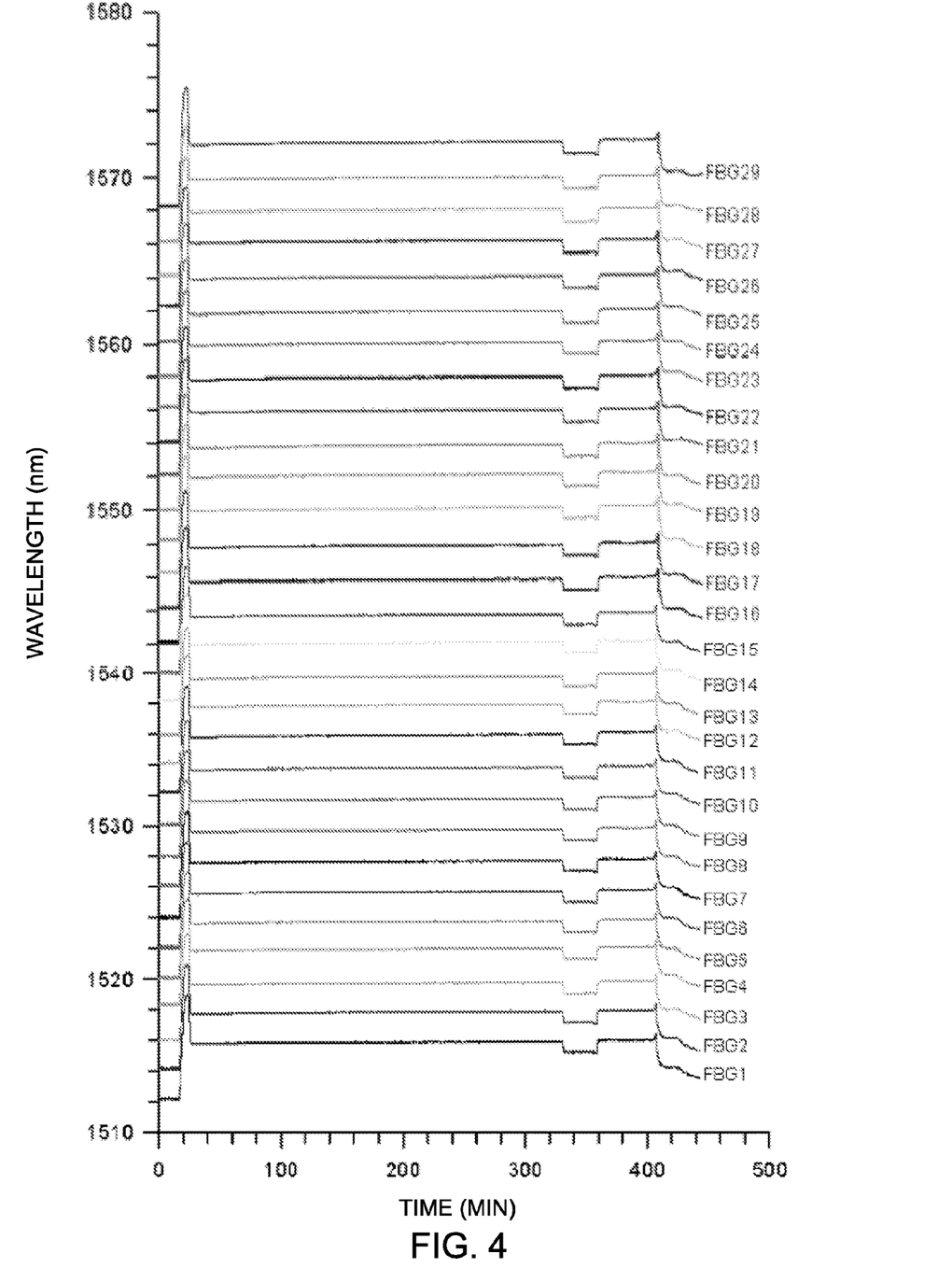
FIG. 4 is an exemplary wavelength shift spectrum of a plurality of Bragg gratings in the FBG sensing cable of FIG. 1 in response to temperature change within a gas turbine testing time period.

Coefficients a, b and c can be obtained by, for example, prior experimental calibration using thermometers such as thermocouples, Resistance Temperature Detectors (RTDs) or Platinum Resistance Thermometers (PRTs). An example of values of coefficients obtained by experimental calibration is $a=4.87$, $b=3.20\times10^{-3}$ and $c=-8.0\times10^{-7}$. It is convenient to arrange a plurality of Bragg gratings 14 for multi-point measurement of the environment within the compact FBG sensing cable package 10. In certain embodiments, the plurality of Bragg gratings 14 are designed with different wavelengths with a wavelength spatial separation of 0.5 nanometers to 100 nanometers to avoid any potential peak overlapping during measurement. FIG. 3 illustrates an exemplary wavelength spectrum of a number (N) of Bragg gratings 14 within the same optical fiber 12. As is shown, each Bragg grating 14 has a unique wavelength, and thus can be differentiated from each other when received by the detector module 30. FIG. 4 illustrates an exemplary wavelength shift spectrum of the plurality of Bragg gratings, within a certain time period (T), in response to a temperature change. The FBG sensing cable package 10 thus can be used for online data analysis which can provide both averaged exhaust temperature and/or local temperature for gas turbine control and optimization. Although each Bragg grating 14 has different central wavelength, the wavelength shift will be substantially proportional to temperature variation. The conversion from wavelength shift to temperature is based on equation 4.

Figure 5:
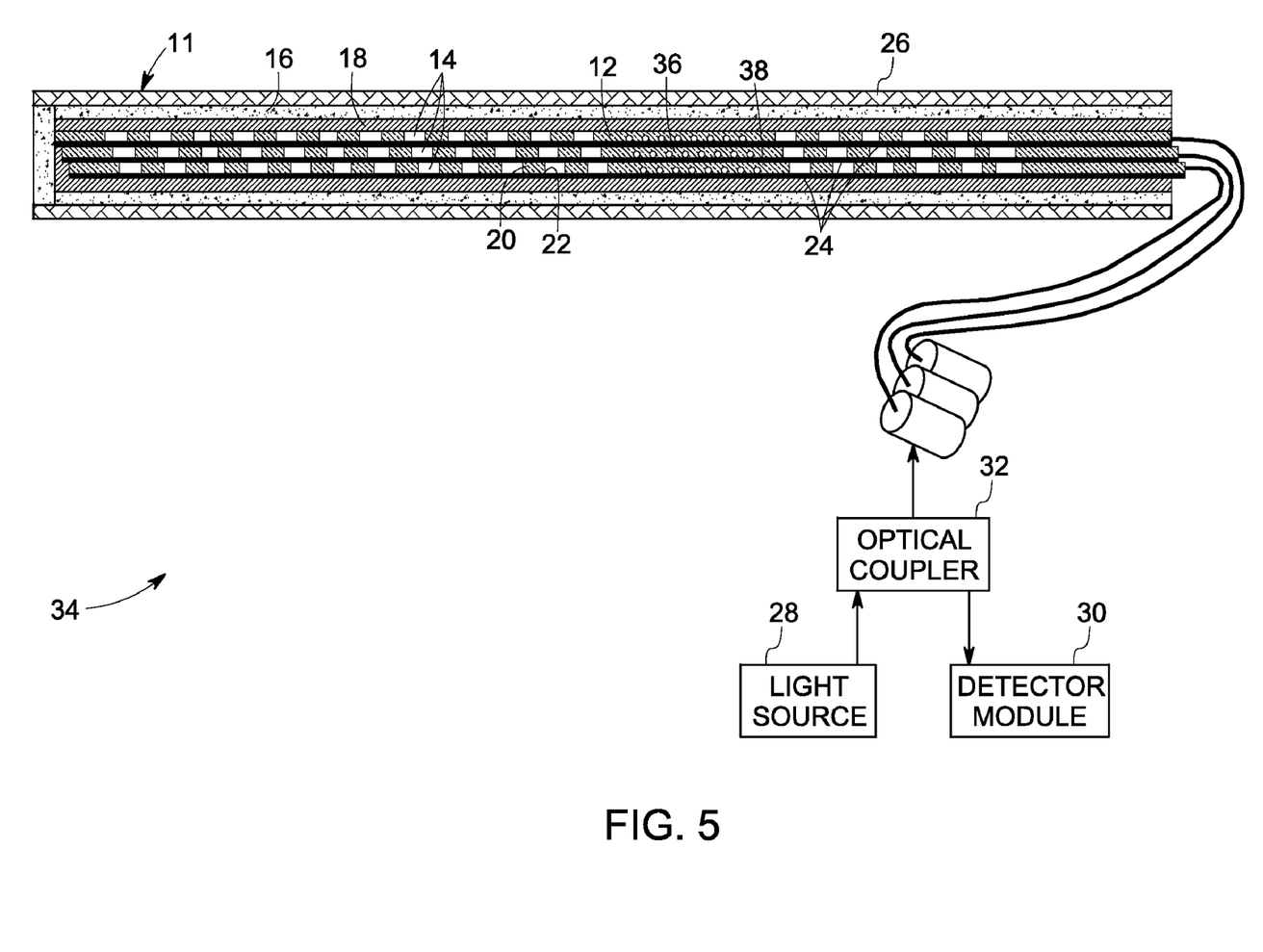
FIG. 5 is a partially cross-sectional view of a multiple FBG sensing fibers cable package according to another embodiment of the invention.

In certain embodiments, the FBG sensing cable package 10 may include two or more optical fibers 12 within the same FBG sensing cable 11 to carry more Bragg gratings 14. Referring to FIG. 5, an FBG sensing cable package 34 according to another embodiment of the invention comprises first, second and third optical fibers 12, 36, 38 within the same FBG sensing cable 11. Each of the first, second and third optical fibers 12, 36, 38 is inscribed with a plurality of Bragg gratings 14. In one embodiment, the Bragg gratings 14 in the same optical fiber 12 are distributed along the general longitudinal direction. In one embodiment, Bragg gratings 14 in different optical fibers are staggered along the longitudinal direction of the FBG sensing cable 11. With multiple fibers, the Bragg gratings 14 can be arranged in a more compact manner along the longitudinal direction and more points along the longitudinal direction can be measured. In one embodiment, first, second, and third optical fibers 12, 36, 38 are respectively surrounded by corresponding fabric layers 18, and then further received in the sheath tube 16. In another embodiment, first, second, and third optical fibers 12, 36, 38 are surrounded by one common fabric layer 18 and then further received in the sheath tube 16.

Figure 6:
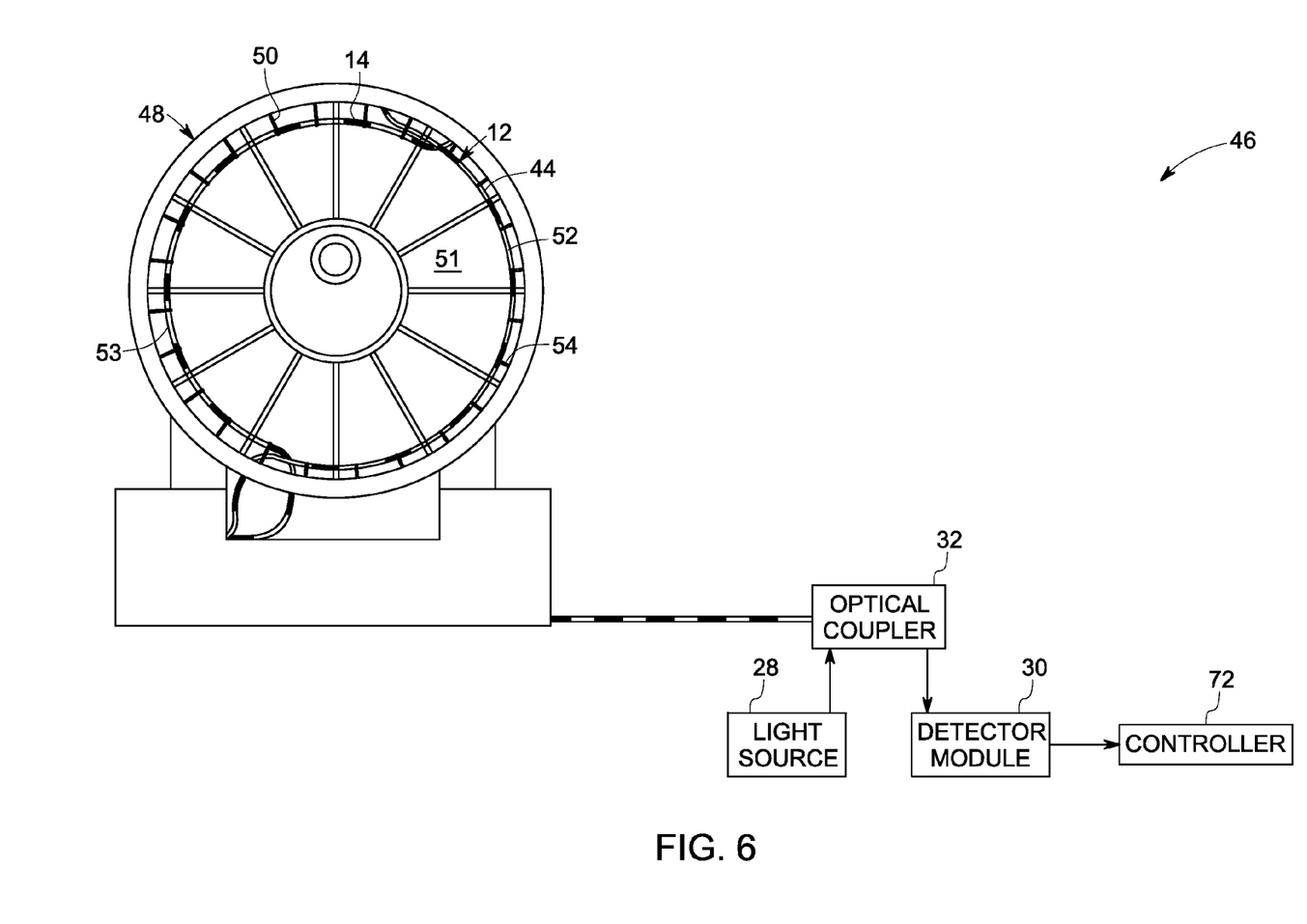
FIG. 6 is an exemplary of FBG temperature sensing system, installed in an exhaust duct of a gas turbine according to one embodiment of the invention.
Figure 7:
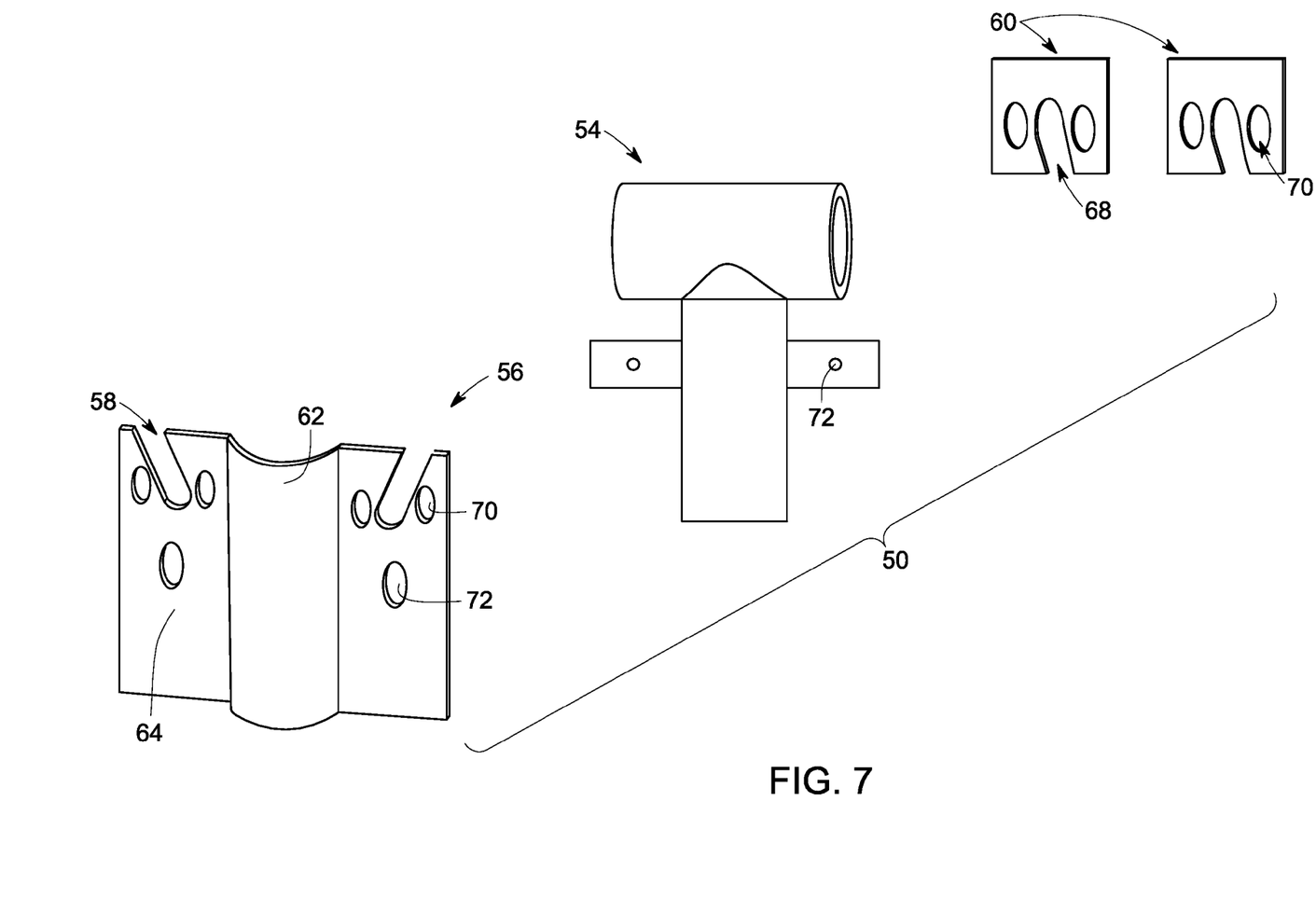
FIG. 7 is an exemplary exploded view of a clamping device comprising a radiation tee for securing a pair of FBG sensing cables with a circumferential FBG sensing cable assembly close to a top portion of the radiation tee.
Figure 8:
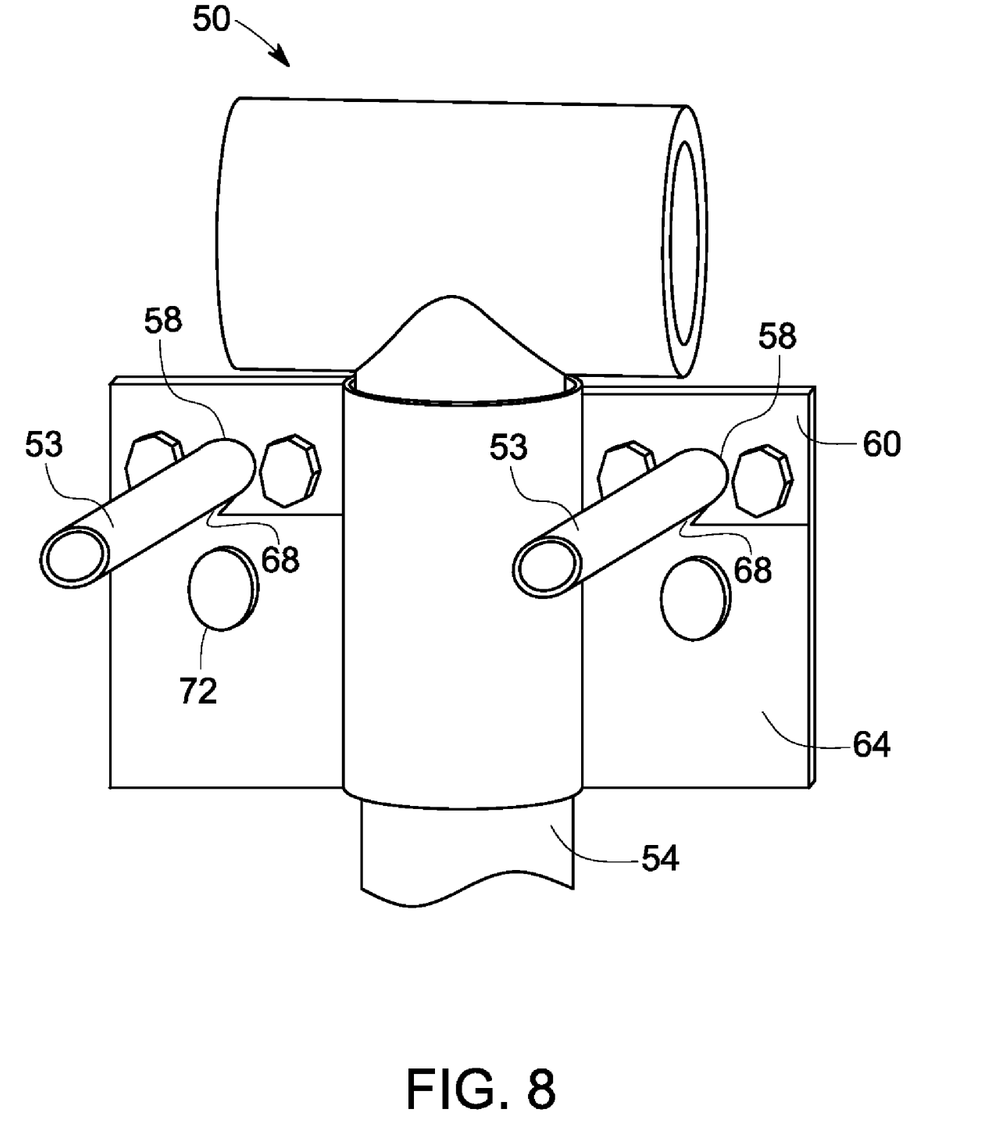
FIG. 8 is a perspective view of the clamping device of FIG. 7 for securing the FBG sensing cables inside the exhaust duct of the gas turbine with existing radiation tee.

FIGS. 6-8 illustrate an exemplary FBG based distributed temperature sensing system 44, used in a gas turbine system, for example, for multi-point exhaust temperature measurement and thermal profiling. Referring to FIG. 6, in one exemplary embodiment of the invention, the FBG sensing system 44 is used in a gas turbine 46 for measurement of exhaust temperature of the gas turbine 46. Gas turbine 46 comprises a diffuser wall 48 enclosing a central barrel 49 therein. Diffuser wall 48 has a substantially circumferential cross-sectional view. FBG sensing system 44 comprises a plurality of clamping devices 50 in an inner surface of the diffuser wall 48, and a FBG sensing cable package 52 comprising a circumferential FBG sensing cable 53 supported by the clamping device 50. The FBG sensing cable package 52 comprises at least one optical fiber 12 and a plurality of Bragg gratings inscribed in the optical fiber such as discussed with respect to FIGS. 1 and 2 above one optical fiber or multiple fibers and/or cables may be used if desired. When a plurality of Bragg gratings 14 are distributed along the circumferential optical fiber or fibers, a circular thermal profile may be mapped along the optical fiber path by monitoring wavelength shifts of the Bragg gratings 14. In one embodiment, the detailed design of the FBG sensing cable 53 may be similar to that as described with respect to FBG sensing cable 11 of FIGS. 1 and 4.

Under elevated temperature, FBG sensing cable 53 has a thermal expansion along the circumferential direction, and the thermal expansion induces stress and strain in the FBG sensing cable 53 which induces wavelength shifts for the Bragg gratings 14. In certain embodiments, FBG sensing cable package 52 may comprise two or more FBG sensing cables connected in series to cover a whole circumferential length of the inner surface of the diffuser wall 48. In the illustrated embodiment of FIG. 6, FBG sensing cable package 52 comprises two semi-circular FBG sensing cables 53 connected in serials to extend along the whole circumferential length of the inner surface of the diffuser wall 48. Each FBG sensing cable 53 thus bears some of the thermal expansion along the whole circumference to reduce the risk of cable breakage and improve accuracy of temperature measurement.

FIGS. 7 and 8 are respectively an enlarged exploded view and an enlarged perspective view of one clamping device 50. In the illustrated embodiment, clamping device 50 comprises a radiation tee 54 secured to the inner surface of the diffuser wall 48 (FIG. 6), a fixation element 56 fixed to an upper portion of the radiation tee 54 and defining mounting holes 58 for retaining the FBG sensing cable 53, and at least one securing element 60 attached to the fixation element 56 for securing the FBG sensing cable 53 in the mounting holes 58. In certain embodiments, radiation tee 54 has a height of above 30 centimeters, and accordingly the FBG cable 53 supported in the fixation element 56 is spaced from the inner surface of the diffuser wall 48 by about 30 centimeters. In certain embodiments, clamping device 50 and radiation tee 54 comprise the same material as sheath tube 16 for ease of thermocouple installation and protection.

In one embodiment, the fixation element 56 has a middle concave portion 62 for matching a front outer peripheral surface of the radiation tee 54, and at least one plate 64 extending from the middle concave portion 62. In the illustrated embodiment, the fixation element 56 comprises a pair of plates 64 extending laterally from the middle concave portion for securing two FBG sensing cables 53. Each plate 64 defines at least one mounting hole 58 for receiving the FBG sensing cable 53 and limiting a downward movement of the FBG cable 53. In one embodiment, each mounting hole 58 comprises an oblique slot extending through an upper edge of the plate 62 for facilitating easier mounting of the FBG sensing cable 53 in the mounting hole 58. Each securing element 60 comprises a mounting hole 68 in correspondence to the mounting hole 58. In one embodiment, the mounting hole 68 comprises an oblique slot extending through a lower edge of the securing element 60 for facilitating easier mounting of the FBG sensing cable 53 in the mounting hole 68 and limiting an upward movement of the FBG sensing cable 53. In one embodiment, the fixation element 56 and the securing element 60 respectively comprise securing holes 70 for screwing the fixation element 56 and the securing element 60 together. In one embodiment, the fixation element 56 is fixed to the radiation tee 54 by screwing through holes 72.

Referring back to FIG. 6, in one embodiment, the gas turbine 46 further comprises a controller 73 for combustion process control and optimization, for example, for injecting a lean mixture of fuel and air into the gas turbine 46. Temperature variation is a very important indication of the firing process dynamics. Accordingly, controller 73 receives a temperature parameter monitored by the FBG sensing system 44 to perform the control. In one embodiment, gas turbine 46 is originally designed with thermocouples distributed along as a circular ring in the inner surface of the peripheral wall 48, and the radiation tees 54 are originally arranged for mounting thermocouples. The illustrated FBG sensing cable 53 adopts the radiation tees 54 for mounting FBG sensing cable 53 which replace the thermocouples and optionally increases density of measurement points without additional bulky electrical wirings. Accordingly, temperature measurement accuracy is improved, and further enables the controller 73 to perform a more accurate process control and optimization. In other embodiments, the radiation tees 54 may be specially designed for mounting the FBG sensing cable 53. The FBG sensing cables 53 extend along the entire inner circumference of the exhaust duct of gas turbine 46 in some embodiments and along a portion of the inner circumference in other embodiments.

Figure 9:
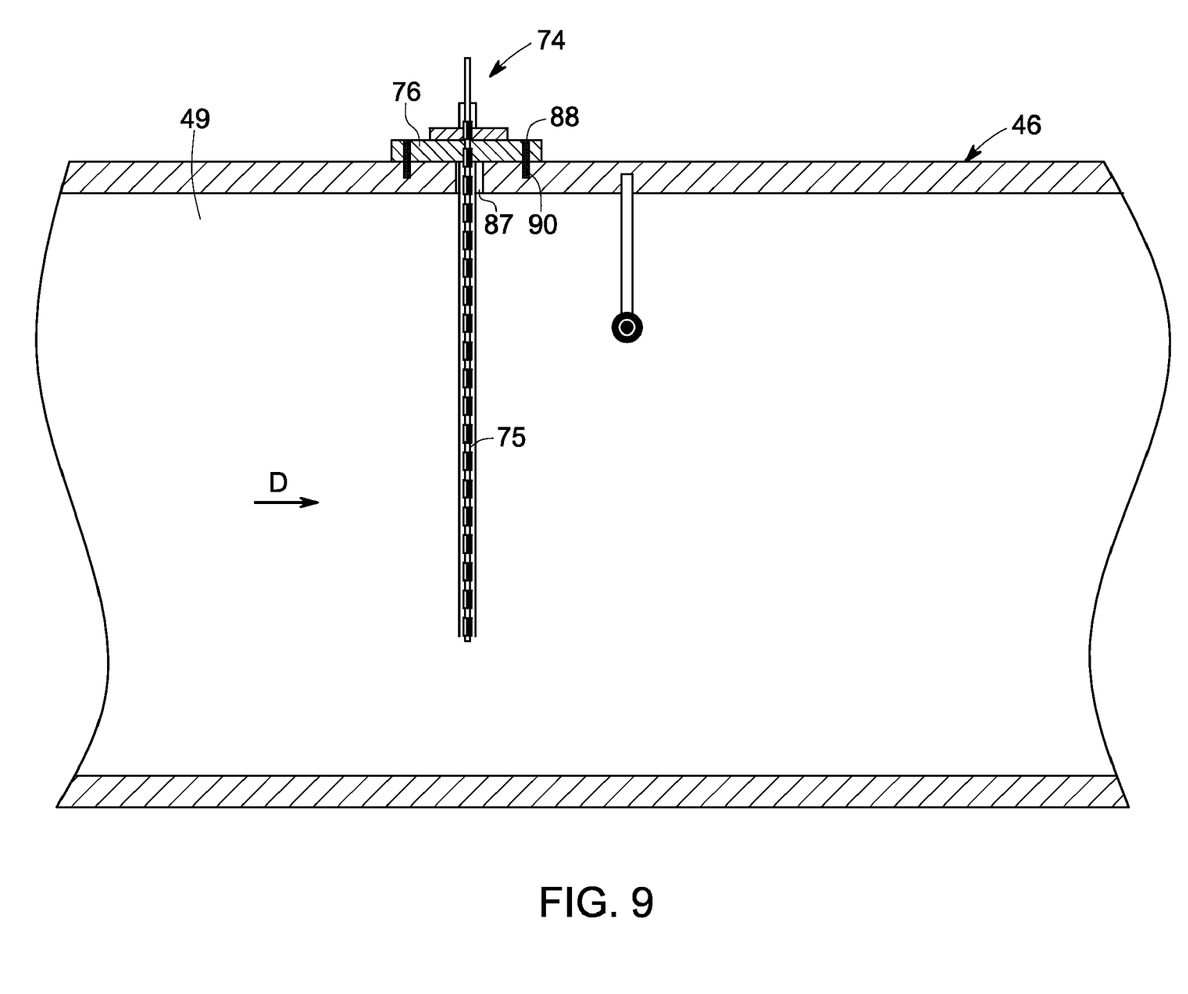
FIG. 9 is an exemplary FBG sensing rake package used in the exhaust duct of the gas turbine according to another embodiment of the invention for radial temperature profile mapping.

Referring to the embodiment of FIG. 9, an FBG sensing system 74 uses FBG sensing cable package 10 or 34 as described with reference to FIGS. 1-5. In the illustrated embodiment of FIG. 9, the FBG sensing cable 75 is substantially in a form of a straight and rigid rake ("FBG sensing rake 75"), and the FBG sensing system 74 comprises a mounting portion 76 for securing the FBG sensing rake 75 to the exhaust duct of the gas turbine 46. As is illustrated, FBG sensing rake 75 extends into gas turbine 46 through holes 87 in the diffuser wall 48 and generally perpendicular to the longitudinal direction or gas flow direction D of the gas turbine 46. In this embodiment, the FBG sensing rake 75 may be used to measure a radial thermal profile of the gas turbine 46 from diffuser wall 48 to central barrel 49. In the illustrated embodiment, the mounting portion 76 is secured to an outer surface of the diffuser wall 48 by screwing through threaded holes 88 and 90 respectively in the mounting portion 86 and the diffuser wall 48 of gas turbine 46. In one embodiment, gas turbine 46 is originally provided with holes 87 in the diffuser wall 48 for mounting thermocouples. In one embodiment, diffuser wall 48 defines a plurality of holes 87 distributed as a ring, and the FBG sensing system 84 comprises a plurality of FBG sensing rakes 75 extending into the gas turbine 46 through corresponding holes 87 for measurements of radial thermal profile of the gas turbine 46.

Figure 10:
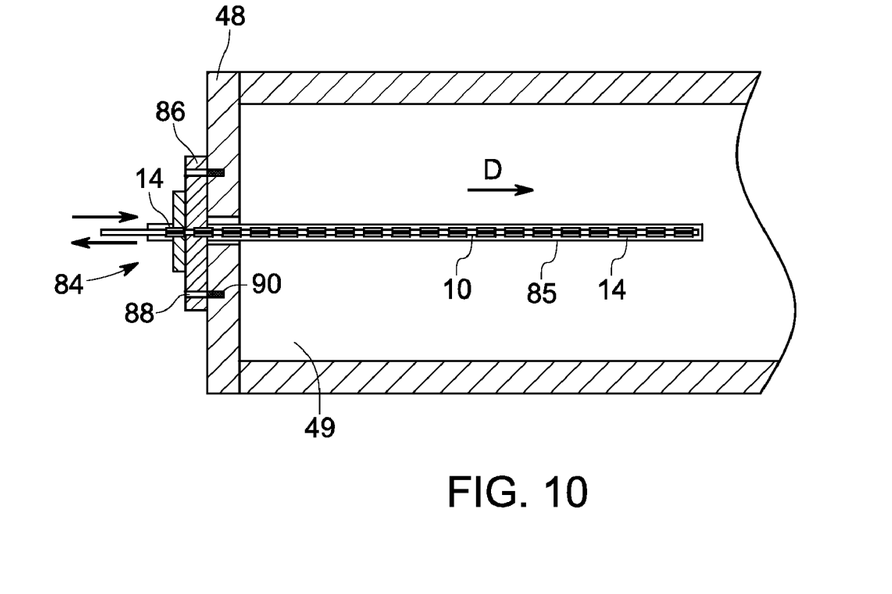
FIG. 10 is an exemplary FBG sensing assembly used in the exhaust duct of the gas turbine according to still another embodiment of the invention.

Referring to the embodiment FIG. 10, an FBG sensing system 84 used in an exhaust duct of gas turbine 46 utilizes FBG sensing cable package 10 or 34 as described with reference to FIGS. 1-5, and comprises a mounting portion 86 for securing the FBG sensing system 84 to the exhaust duct of the gas turbine 46. In the illustrated embodiment, FBG sensing cable or rake 85 extends along a central axis of the gas turbine 46 and generally along gas flow direction D in the gas turbine 46. Thus, FBG sensing system 84 can be used to measure an axial thermal profile of the gas turbine 46. FBG sensing rake 85 may extend out of the gas turbine 46 with Bragg gratings 14 distributed therealong, and thus a thermal profile along the central direction of the gas turbine 46 from inside the gas turbine 46 to outside of the gas turbine 46 can be obtained. In one embodiment, the mounting portion 86 is secured to an outer surface of the combustor wall 48 by screwing through threaded holes 88 and 90 respectively in the mounting portion 86 and the peripheral wall 48 of gas turbine 46.

Figure 11:
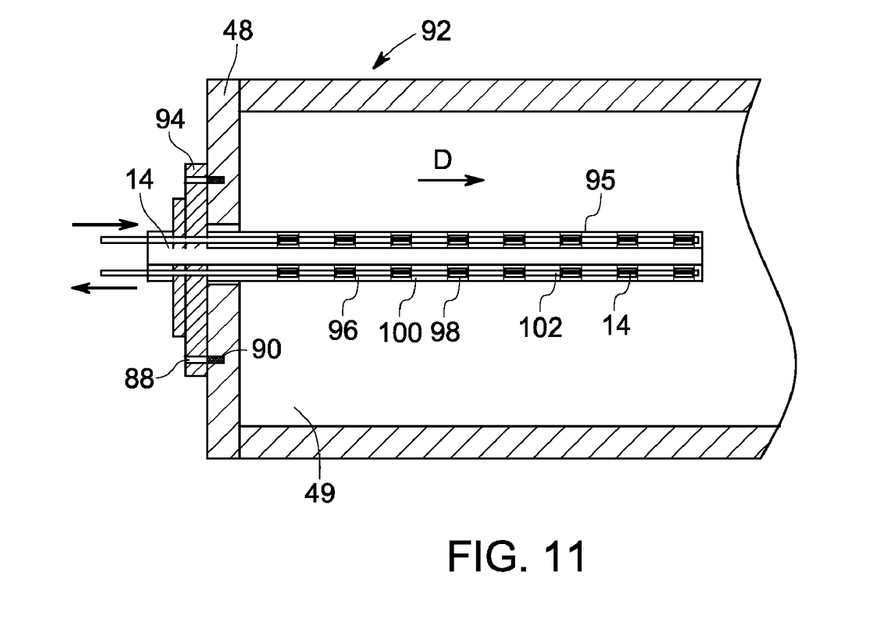
FIG. 11 is an exemplary FBG sensing assembly used in the exhaust duct of the gas turbine according to still another embodiment of the invention.
Figure 12:
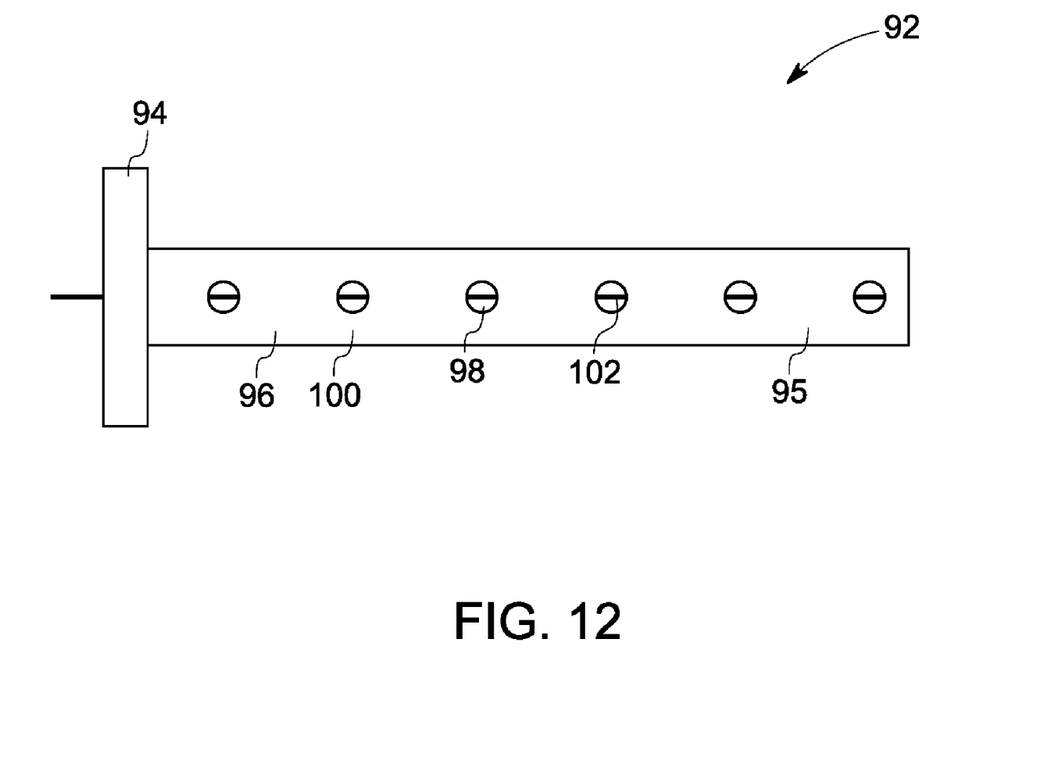
FIG. 12 is a front view of a FBG sensing rake of the FBG sensing assembly of FIG. 11.

Referring to FIGS. 11 and 12, an FBG sensing system 92 used in an exhaust duct of gas turbine 46 utilizes FBG sensing cable package 10 or 34 as described with reference to FIGS. 1-5, and comprises a mounting portion 94 for securing the FBG sensing system 92 to the exhaust duct of the gas turbine 46. In the illustrated embodiment, the FBG sensing system 92 comprises an FBG cable or rake 95 extends along a central axis of the gas turbine 46 and generally along gas flow direction D in the gas turbine 46. Thus, FBG sensing system 92 can be used to measure an axial thermal profile of the gas turbine 46. In the illustrated embodiment, FBG sensing rake 95 comprises a rigid rod 96 defining a plurality of through-holes 98 in an outer surface of a tubular wall 100. FBG sensing rake 95 comprises at least one fiber 102 in the secured in the tubular wall 100. Fiber 102 is inscribed with a plurality of Bragg gratings 14 and each Bragg grating is arranged in a corresponding through-hole 98 in the tubular wall 100. Accordingly, the Bragg gratings 14 are more sensitive to temperature change of the exhaust duct of gas turbine 46 and a fast response of temperature can be obtained. In one embodiment, the through-holes 98 in the rod 96 are originally provided for mounting TCs. In certain embodiments, fiber 102 is secured to the outer surface of the rod 96. In one embodiment, a method of securing the fiber 102 to the outer surface the rod 96 comprises first cutting a slot in the outer surface of the rod 96, inserting the fiber 102 into a metal sheath tube to form a fiber sensing tube and then securing the fiber sensing tube to the outer surface of the metal rod, placing the fiber sensing tube in the slots with the Bragg gratings in the corresponding through-holes 98; and then embedding the fiber sensing tube in the outer surface of the rod 96 by filling adhesive material in the slots.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A fiber Bragg grating multi-point temperature sensing system for sensing a temperature profile in a gas turbine, the fiber Bragg grating multi-point temperature sensing system comprising:
 a fiber sensing cable package comprising:
  a fiber Bragg grating based temperature sensing cable comprising at least one optical fiber, a plurality of Bragg gratings inscribed in the optical fiber, a fabric layer surrounding the optical fiber, and a sheath tube surrounding the optical fiber; and
  a plurality of clamping devices distributed along an inner surface of a wall of the gas turbine in a circumferential direction for securing the fiber sensing cable,
  wherein each clamping device comprises a radiation tee secured to the inner surface of the wall and at least one mounting hole,
  wherein the fiber sensing cable extends through the mounting holes of the clamping devices, and
  wherein each clamping device comprises a fixation element secured to the radiation tee and defining at least one mounting hole for receiving the fiber Bragg grating based temperature sensing cable, and a securing element detachably securing with the fixation element for securing the fiber Bragg grating based temperature sensing cable.

2. The fiber Bragg grating multi-point temperature sensing system according to claim 1, wherein each securing element defines a mounting hole in correspondence with the mounting hole in the fixation element for receiving the fiber Bragg grating based temperature sensing cable.

3. The fiber Bragg grating multi-point temperature sensing system according to claim 2, wherein the mounting hole in the fixation element comprises a slot extending through an upper edge of the fixation element, and the mounting hole in the securing element comprises a slot extending though a lower edge of the fixation element.

4. The fiber temperature sensing cable package according to claim 1 further comprising a at least one additional fiber sensing cable package with the fiber sensing cable packages each being secured along a separate circumferential length of the wall.

5. The fiber temperature sensing cable package according to claim 1 wherein the wall comprises a gas turbine diffuser wall.

6. The fiber Bragg grating multi-point temperature sensing system according to claim 1, wherein the fabric layer comprises silicon dioxide or silica material.

7. The fiber Bragg grating multi-point temperature sensing system according to claim 1 further comprising a reinforcement member enclosed in the fabric layer.

8. The fiber Bragg grating multi-point temperature sensing system according to claim 1, wherein the sheath tube comprises an austentitic nickel-chromium alloy or stainless steel sheath tube.

9. The fiber temperature sensing cable package according to claim 1, wherein an outer diameter of the sheath tube is larger than 6.35 millimeters, and wherein a wall thickness of the sheath tube is greater than 1.2 millimeters.

10. The fiber temperature sensing cable package according to claim 1 further comprising a fiber woven sleeve surrounding the sheath tube to block long-wavelength thermal radiation.

11. A fiber Bragg grating multi-point temperature sensing system for sensing a temperature profile in a gas turbine, the fiber Bragg grating multi-point temperature sensing system comprising:
 a fiber sensing cable package comprising:
  a fiber Bragg grating based temperature sensing cable comprising at least one optical fiber, a plurality of Bragg gratings inscribed in the optical fiber, a fabric layer surrounding the optical fiber, and a sheath tube surrounding the optical fiber;
 a plurality of clamping devices distributed along an inner surface of a wall of the gas turbine in a circumferential direction for securing the fiber sensing cable, and
 a reinforcement member enclosed in the fabric layer, wherein the reinforcement member comprises one or more multi-mode fibers.

12. A fiber Bragg grating multi-point temperature sensing system for sensing a temperature profile in a gas turbine, the fiber Bragg grating multi-point temperature sensing system comprising:
 a fiber sensing cable package comprising:
  a fiber Bragg grating based temperature sensing cable comprising at least one optical fiber, a plurality of Bragg gratings inscribed in the optical fiber, a fabric layer surrounding the optical fiber, and a sheath tube surrounding the optical fiber;
 a plurality of clamping devices distributed along an inner surface of a wall of the gas turbine in a circumferential direction for securing the fiber sensing cable, wherein the sheath tube comprises a polished outer surface to reflect short-wavelength thermal radiation.

* * * * *